United States Patent [19]

Lundström et al.

[11] Patent Number: 5,372,758
[45] Date of Patent: Dec. 13, 1994

[54] MOLD AND METHOD FOR MOLDING FERRULES

[75] Inventors: Lars E. P. Lundström, Saltsjö-Boo; Dragutin Tretinjak, Kristiansstad; Paul A. Eriksen, Tyresö; Jan-Åke Engstrand, TrÅngsund; Hans-Christer Moll, Enskede; Eva Ahlner, Hägersten; Ivan Jonas, Åkersberga, all of Sweden

[73] Assignee: Telefonakitebolaget L M Ericsson, Stockholm, Sweden

[21] Appl. No.: 51,350

[22] Filed: Apr. 23, 1993

[30] Foreign Application Priority Data

Apr. 27, 1992 [SE] Sweden ................. 9201310

[51] Int. Cl.$^5$ .................. B29C 45/14; G02B 6/38
[52] U.S. Cl. .................. 264/1.25; 249/94; 249/95; 249/97; 264/2.5; 264/275; 425/116; 425/129.1
[58] Field of Search .............. 249/94, 95, 97; 264/1.5, 2.5, 277, 275; 425/116, 123, 129.1, 121

[56] References Cited

U.S. PATENT DOCUMENTS

| | | | |
|---|---|---|---|
| 2,242,117 | 5/1941 | English et al. | 264/277 |
| 3,739,438 | 6/1973 | Lambrecht | 425/123 |
| 4,107,242 | 8/1978 | Runge | 264/1.5 |
| 4,543,228 | 9/1985 | Bingler | 264/275 |
| 4,689,005 | 8/1987 | Plummer | 264/1.5 |
| 4,942,009 | 7/1990 | Ohshima | 264/1.5 |

FOREIGN PATENT DOCUMENTS

WO87/02147 4/1987 WIPO .

*Primary Examiner*—Jay H. Woo
*Assistant Examiner*—Robert B. Davis
*Attorney, Agent, or Firm*—Burns, Doane, Swecker & Mathis

[57] ABSTRACT

The present invention relates to a mold for simultaneously molding a plurality of ferrules onto a corresponding number of optical fibers. The mold preferably includes a runner plate, a first cavity plate, a second cavity plate, and a support plate, each of which is to be inserted between a movable top plate and a fixed bottom plate of a transfer molding machine. The plates to be inserted have a vertical inlet channel and primary and secondary runners for distributing molding compound. These runners lead to a plurality of first and second mutually coincidental mold cavities arranged in rows in the first and second cavity plates, respectively. In a preferred embodiment, each of the first and second mold cavities are made up of mutually coincidental, cylindrical coaxial parts and a larger coaxial, cylindrical bore formed in one or both cavity plates. The dividing plane between the first and second cavity plates coincides with the wider bore. The second mold cavity is formed in a conical insert which is inserted into the second cavity plate. The support plate includes narrow optical fiber receiving slots.

22 Claims, 7 Drawing Sheets

MOLD AND METHOD FOR MOLDING FERRULES

TECHNICAL FIELD

The present invention relates to a mold which is intended for molding simultaneously a plurality of ferrules on a corresponding number of optical fibers, said mold being comprised of a plurality of plates which are intended to be inserted between the movable top plate and the fixed bottom plate of a transfer molding machine, said plates including a runner plate which is intended to lie against the movable top plate, a first cavity plate, a second cavity plate, and a support plate which is intended to lie against the fixed bottom plate, wherein the runner plate has a vertical inlet channel which faces towards the top plate and primary runners through which molding compound is distributed and which are disposed in the other side of said runner plate, and wherein the first cavity plate has vertical channels which connect with the primary runners and also with secondary runners which are provided in the first or the second cavity plate and which lead to a plurality of first and second mutually coinciding ferrule molding cavities arranged in rows in the first and the second cavity plate respectively.

BACKGROUND ART

In order to enable optical fibers to be connected together in electrical contact devices for instance, it is necessary to center the fibers accurately in relation to one another. To this end, are used ferrules which are connected to the ends of respective fibers and used as fiber centering guides, since the fiber ends cannot themselves be used for this purpose. The ferrules are provided with a central hole into which the optical fiber is inserted and then glued or welded into firm contact with the ferrules, whereafter the outwardly protruding fiber end and the end of the ferrule are ground and polished to a flat surface. The drawback with this method is that the task of securing the ferrule on the end of the fiber is both work-demanding and time-consuming.

SUMMARY OF THE INVENTION

The object of the present invention is to avoid the drawback of earlier methods of connecting ferrules to optical fibers; by providing a mold with which the ferrules can be molded directly onto the fibers and a method for molding ferrules onto the fibers. Preferably, a plurality of ferrules are molded simultaneously on a corresponding number of fibers.

The molding method used is a transfer molding method or, alternatively, an extrusion molding method. The mold is a modified leaf-mold or book-mold designed especially for molding ferrules onto optical fibers. The mold shall have the following properties: Axial centering of the fiber in the ferrule, cold charging of the fibers, a flashless cylindrical part on the ferrule, and an adaption to long fibers during the molding process. The molding compound used is a thermosetting compound, such as epoxy resin, novolack or a thermoplastic substance in a variant which uses the variation in the temperature of the mold when transfer molding.

When molding a plastic ferrule onto an optical fiber, it is essential that no flash forms on any side of the ferrule body. These parts are essential in centering the optofiber axially. Any flash that is present may instead form on a wider central part or collar on the ferrule body.

The invention will now be described in more detail with reference to a preferred embodiment thereof and also with reference to the accompanying drawings.

DETAILED DESCRIPTION OF THE PREFERRED EMBODIMENTS

Figure 1:
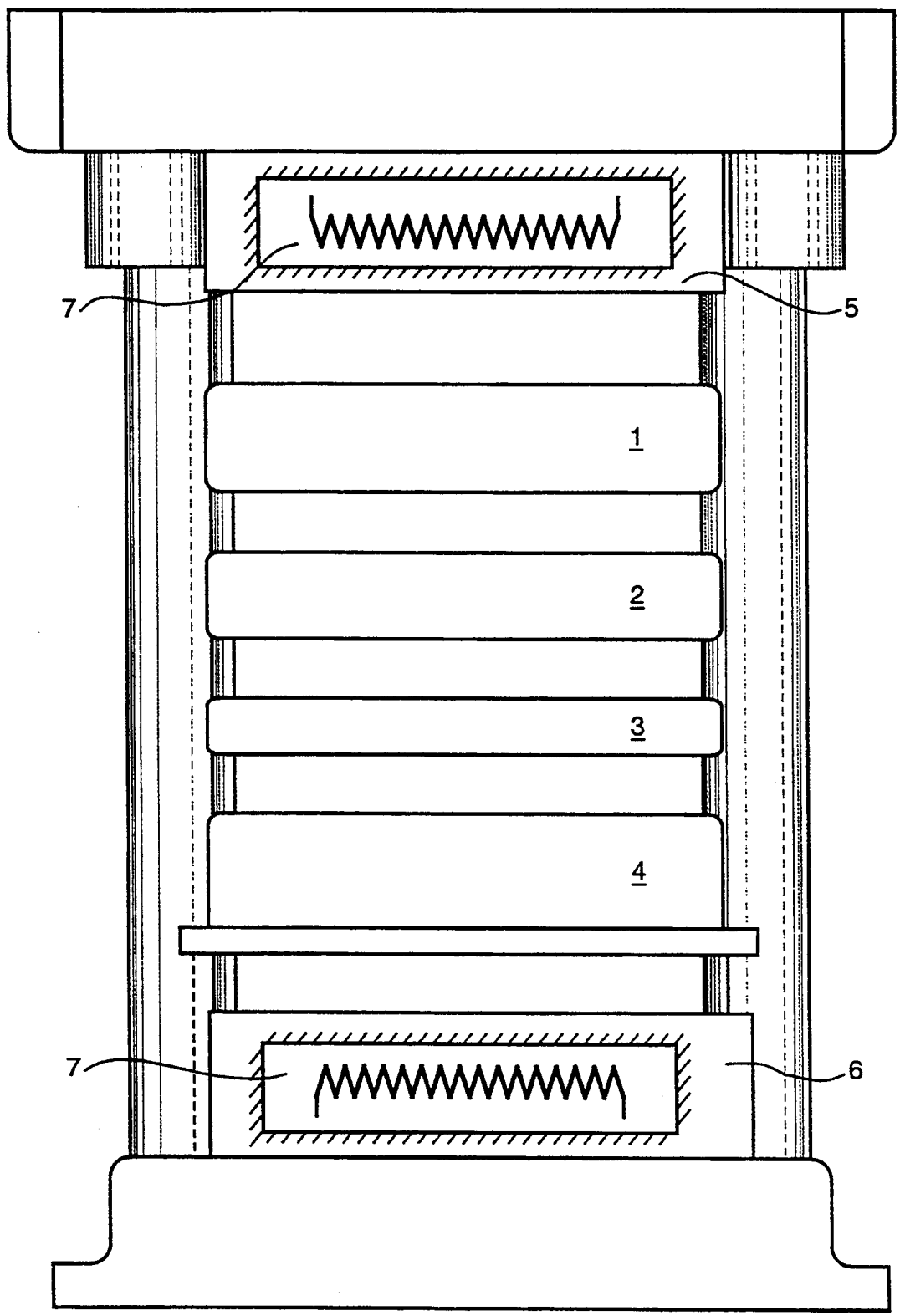
FIG. 1 illustrates schematically the various plates of a mold constructed in accordance with the invention, and shows their relative position in a transfer press.

FIG. 1 illustrates schematically an inventive mold construction and illustrates the mold placed in a molding machine, for instance a transfer press or an extrusion press. In another type of molding machine, for instance an automatic multiplunger machine or an injection molding machine, the whole of the system may De rotated through 90° or may be orientated in some appropriate way. The mold is comprised of a novel type of a so-called book mold or leaf mold, where one or more mold cavities are formed, preferably by milling, etching or electrocutting in two of the cavity plates. These two cavity plates are separated centrally in a plane in which runners and outlets are normally located. The mold plates are placed one upon the other between two thicker plates, of which one has a vertical channel immediately beneath the transfer cylinder, and runners. The mold plates are comprised of a runner plate 1, a first cavity plate 2, a second cavity plate 3 and a support plate 4. The plate assembly is placed in metal guide frames (not shown) and loaded into the molding machine, between the movable top plate 5 and the fixed bottom plate 6. The top and bottom plates 5, 6 of the machine are heated as illustrated schematically by the heating units 7.

Figure 2A:
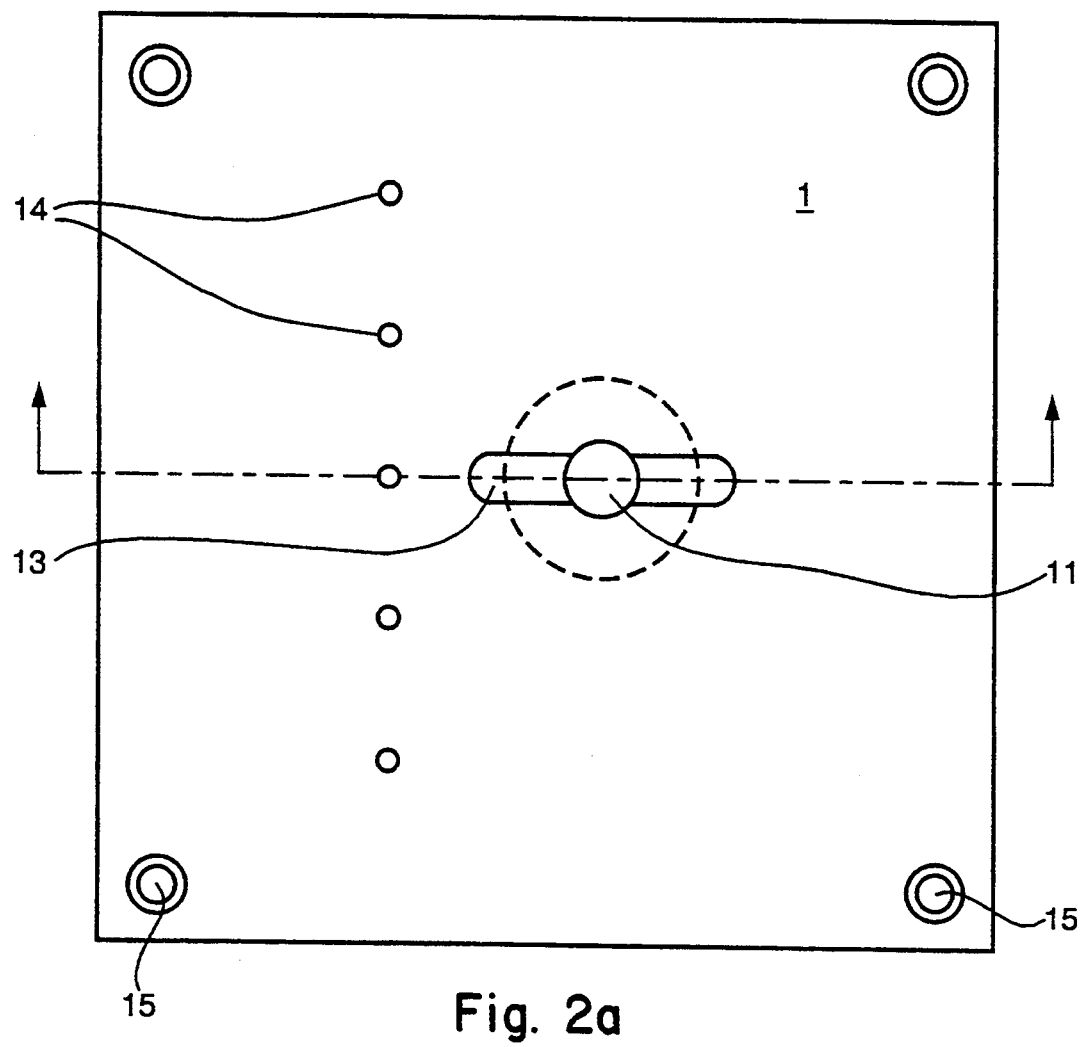
FIG. 2a illustrates a runner plate from beneath.
Figure 2B:
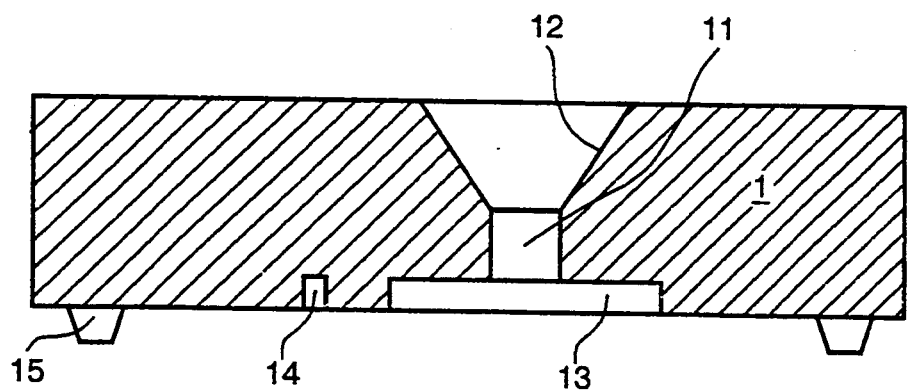
FIG. 2b illustrates a runner plate of FIG. 2a in section.

FIGS. 2a and 2b illustrate the runner plate 1 in more detail and shows the plate from beneath and in section. The runner plate has a vertical inlet channel 11 with a conical inlet opening 12 which lies immediately beneath the transfer cylinder in the molding machine. Primary runners 13 extend from the vertical channel 11 on the underside of the plate. Also provided in the underside of the runner plate 1 are a number of apertures or recesses 14 which coincide axially with cavities in the cavity plates 2 and 3, as will be explained in more detail herebelow. The plate is also provided with positioning pins 15 which function to position the plate in relation to the next following plate in the mold.

Figure 3A:
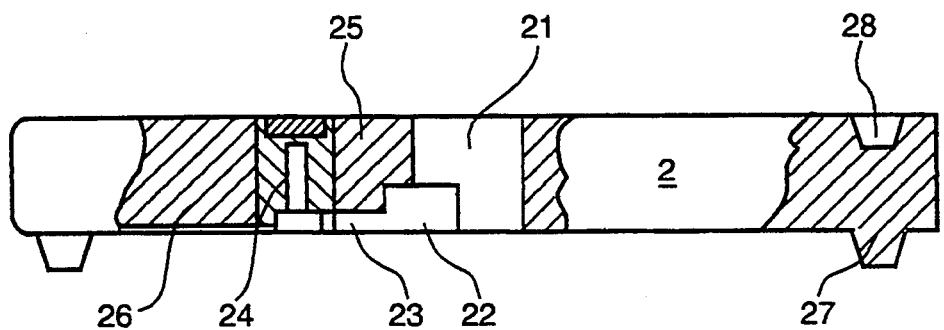
FIG. 3a illustrates a first cavity plate in section.
Figure 3B:
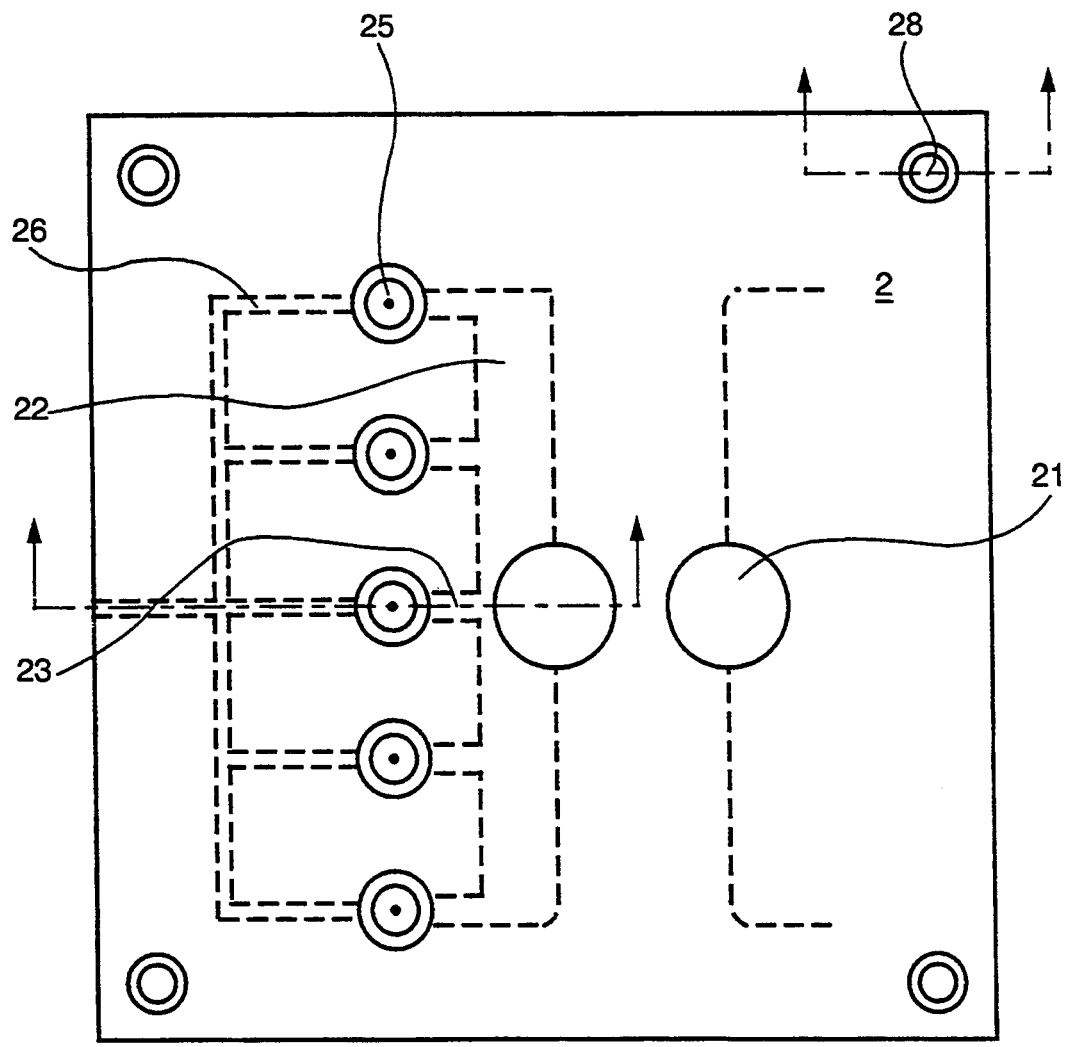
FIG. 3b illustrates a first cavity plate of FIG. 3a from above.

FIGS. 3a and 3b illustrate the first cavity plate 2 from above and in section. This plate includes vertical channels 21 which connect with the primary runners 13 in the runner plate 1, and with secondary runners 22 which extend from the primary runners in the underside of the plate. Cavity channels 23 extend from the secondary runners 22 to the various mold cavities 24, which constitute one half of the total ferrule molding cavity. The cavity 24 is preferably formed in an insert 25 which is inserted into a cylindrical bore in the cavity plate 2. The manner in which the mold cavity is formed will be explained in more detail herebelow with reference to FIG. 6. FIGS. 3a and 3b also indicates the provision of air vent channels 26 through which air escapes during a molding process. The first cavity plate 2 is also provided with positioning pins 27 by means of which the plate is positioned in relation to the following plate in the mold, and also with positioning recesses 28 for positioning the positioning pins 15 of the runner plate 1.

Figure 4A:
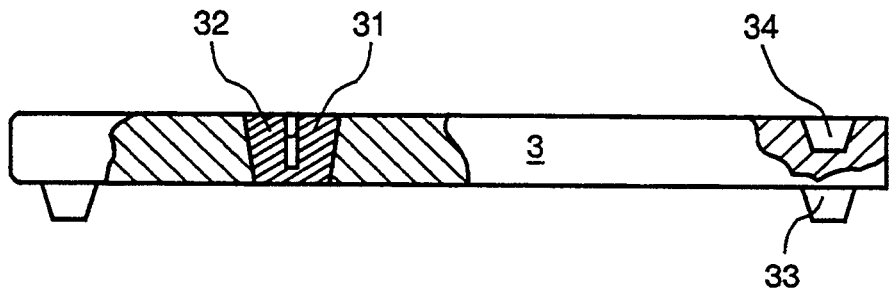
FIG. 4a illustrates a second cavity plate in section.
Figure 4B:
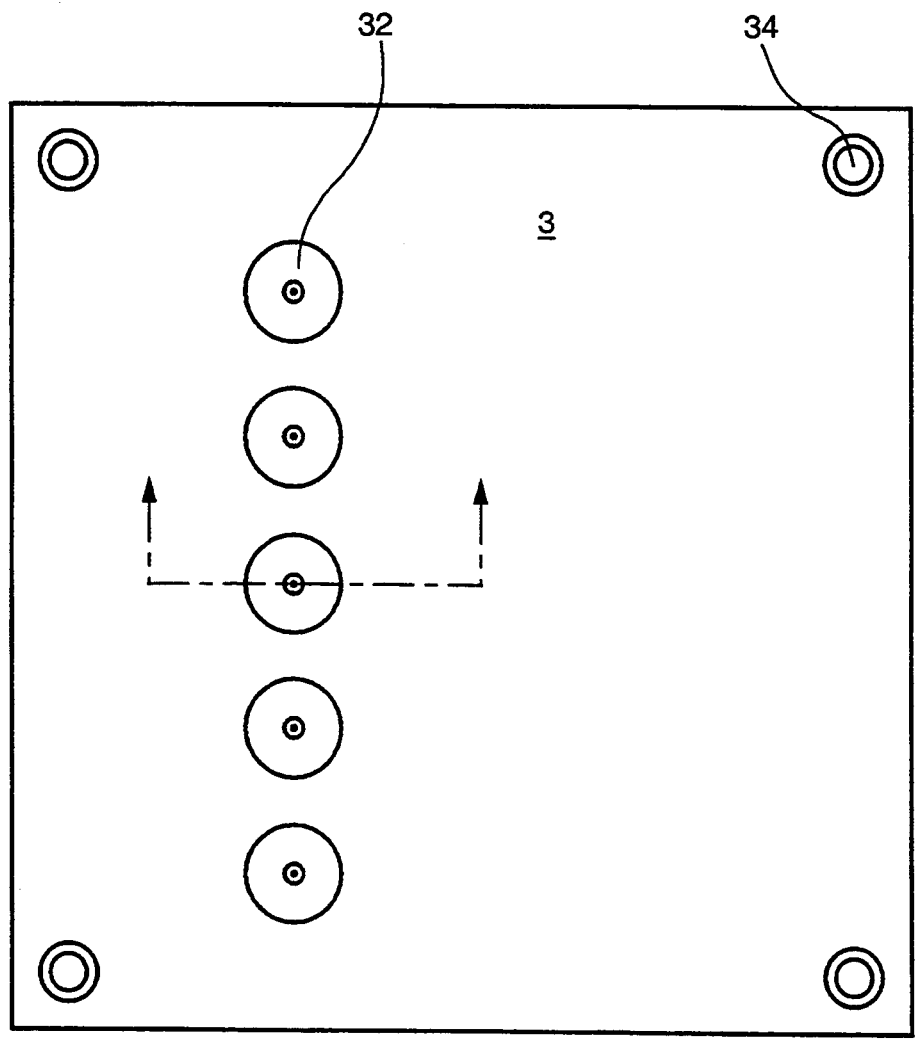
FIG. 4b illustrates the second cavity plate of FIG. 4a from above.

FIGS. 4a and 4b illustrate the second cavity plate 3, from above and in section. This plate includes mold cavities 31 which constitute the other half of the total ferrule molding cavity. The mold cavity 31 preferably has the form of a divided conical insert 32 which is inserted into a corresponding conical bore in the cavity plate 3. The configuration of the mold cavities 31 and the inserts 32 will be described in more detail herebelow with reference to FIGS. 6, 7a and 7b. The second cavity plate 3 is also provided with positioning pins, 33, which position the plate in relation to the next following plate in the mold, and also with positioning recesses, 34, which position the pins 27 of the first cavity plate 2.

Figure 5A:
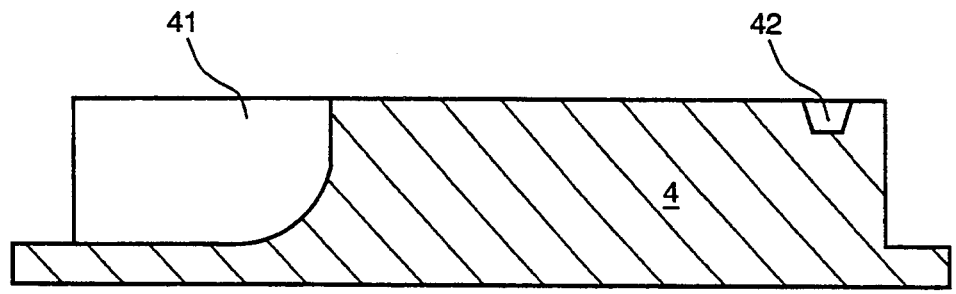
FIG. 5a illustrates a support plate in section.
Figure 5B:
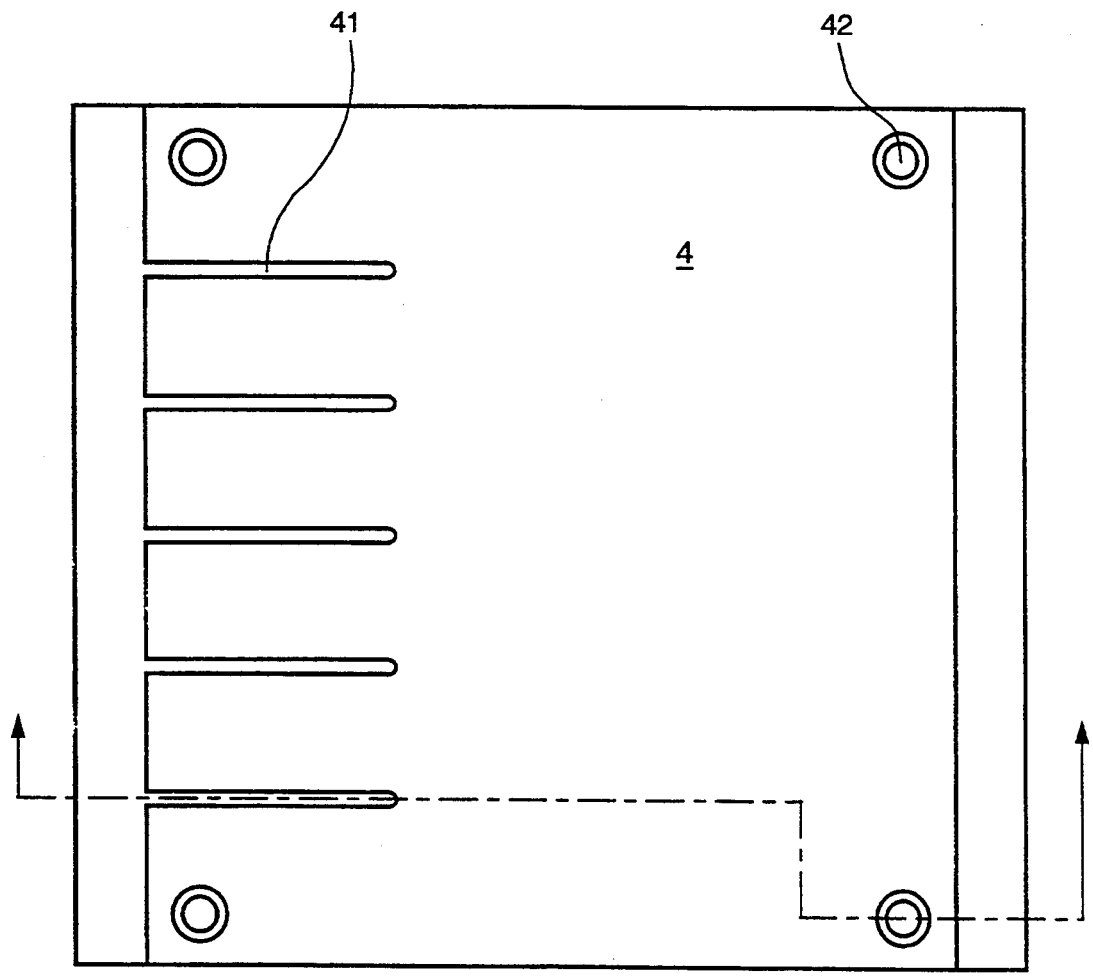
FIG. 5b illustrates a support plate of FIG. 5a from above.

FIGS. 5a and 5b illustrate the support plate 4, from above and in section. The support plate 4 includes a number of slots 41 which extend outwardly from one side of the upper side of the plate and coincide with the cavities 24 and 31 in the cavity plates 2 and 3. The slots 41 function to lead the fibers to one side as the fibers are introduced into the mold and the mold is placed in the molding machine. The support plate 4 is also provided with positioning recesses 42 which function to position the pins 33 on the second cavity plate 3.

It will be understood that the aforedescribed embodiment of the various plates forming part of the inventive mold is only a preferred embodiment and that the configuration of the plates can be varied with regard to their number and also with regard to the positioning of mold cavities and associated channel system through which molding compound is introduced to the cavity plates, and that the devices used to position the plates in relation to one another may also be different to those shown. For example, the secondary runners 22, the mold cavity channels 23 and the air vents 26 may be formed in the upper side of the second runner plate 3 instead of in the first runner plate 2.

Figure 6:
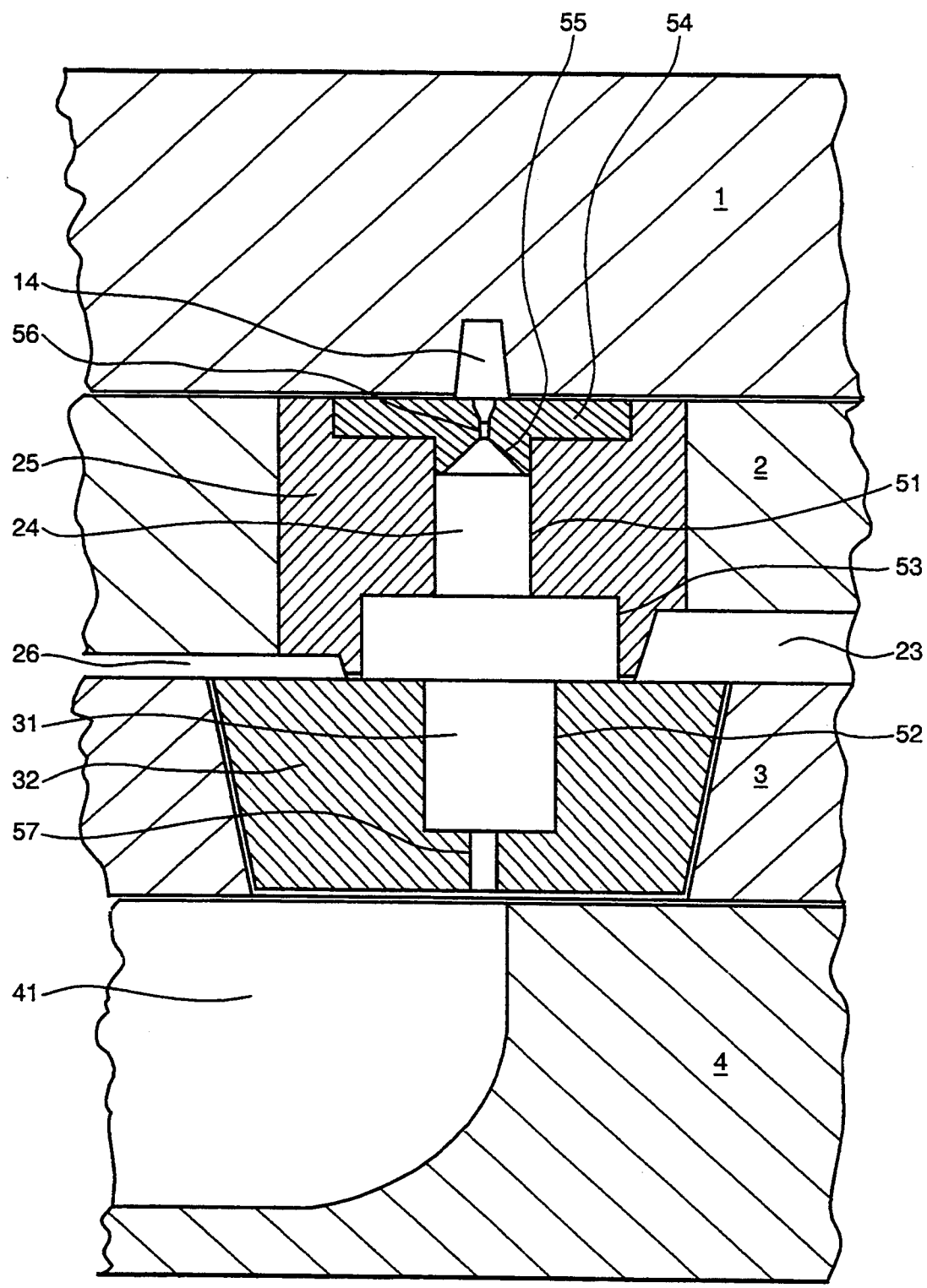
FIG. 6 is a sectional view of part of the assembled mold and shows a ferrule mold cavity.
Figure 7A:
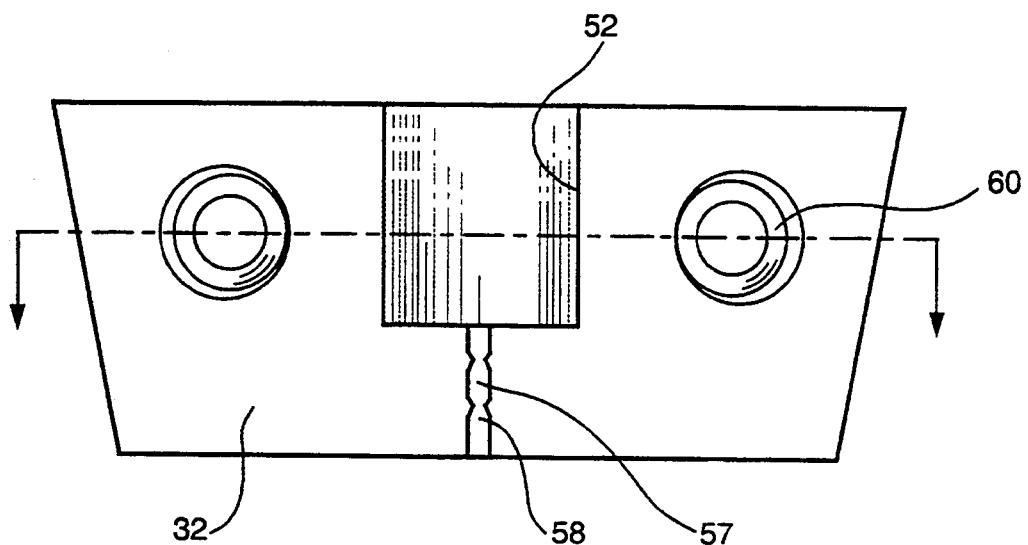
FIG. 7a illustrates a divided mold insert from one side of the dividing plane.
Figure 7B:
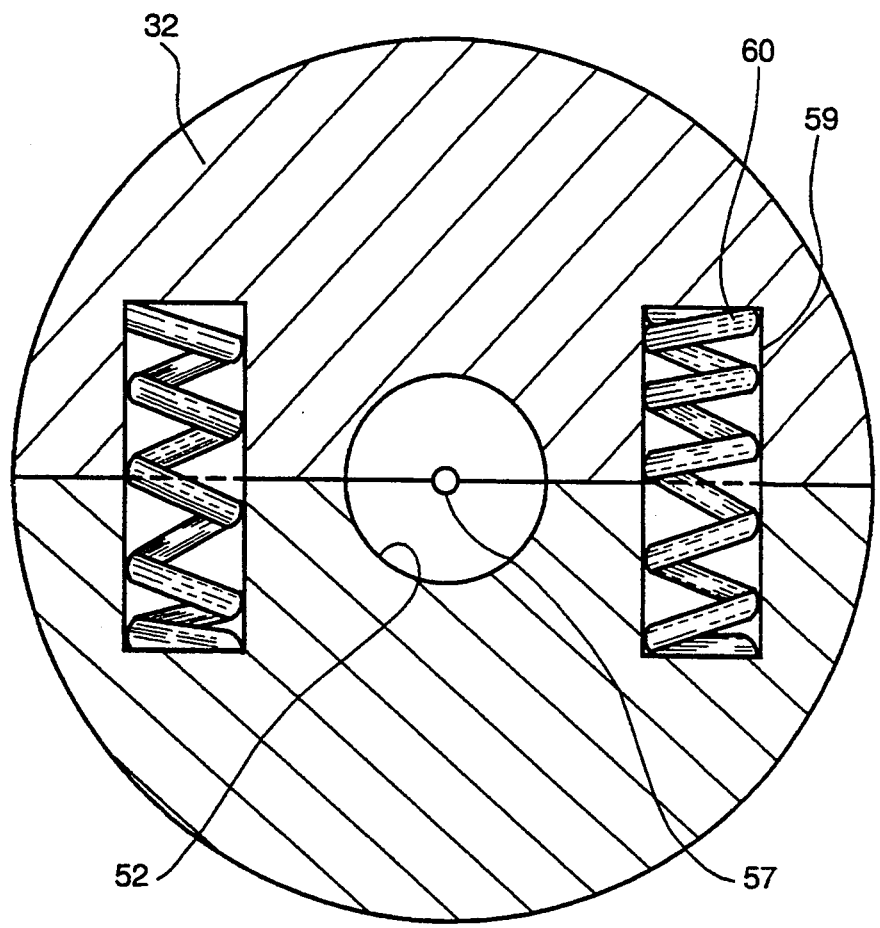
FIG. 7b illustrates the divided mold insert of FIG. 7a from above, in section.

FIG. 6 is a sectional view of part of the assembled mold having a ferrule molding cavity. Thus, FIG. 6 illustrates the various plates 1, 2, 3 and 4 included in the mold, a part of the cavity channel 23 leading to the mold cavity, and the air venting channel 26 leading away from the mold cavity. The total ferrule molding cavity 24 and 31 includes two coaxial, cylindrical parts 51 and 52 having a wider, coaxial cylindrical part or collar 53, which in the illustrated case has the form of a bore in the insert 25 in the first runner plate 2, although it may alternatively be formed in the insert 32 in the second runner plate 3, or may be formed partially in both of the plates 2 and 3. The only condition is that the dividing plane between the runner plates 2 and 3 shall coincide with the broader part 53. This will ensure that any flash that may be formed during the molding process will be formed on the collar and not on the cylindrical parts 51 or 52, which are critical with regard to the centering and lineation of the ferrule in an electric contact device or the like when coupling the optical fiber to another fiber or to some other optical device.

The cylindrical part 51 is preferably comprised of a cylindrical through-pass bore in the insert 25 and is closed at the top by a lid 54, which is screwed firmly in a recess or the like in the insert, or secured thereto in some other suitable manner. The lid 54 preferably has a conical insertion part 55 which faces towards the mold cavity and which function to guide an optical fiber into the opening 56, which is a fiber-adapted hole that is formed precisely in the cavity axis, for instance drilled or laser-drilled therein. The insertion part may also be shaped hyperbolically or tangentially, or in some other suitable manner, preferably to avoid sharp corners. In the case of the illustrated embodiment, the upper half of the mold cavity is formed in an insert 25. This part of the cavity, however, may also be formed directly in the first cavity plate 2, which also applies to the insertion part 55. However, the insertion part 55 is preferably formed in a separate lid 54 which is inserted into a corresponding recess in the cavity plate. The recess 14 in the runner plate 1 is located coaxially with the opening 56 and is intended to receive the outwardly projecting end of the fiber. In the final molded product, i.e. the ferrule, this end and the outwardly projecting conical part of the ferrule are ground away and polished in a plane perpendicular to the ferrule axis.

The cylindrical part 52 which constitutes the other half of the mold cavity, is formed in the insert 32 as a cylindrical bore which merges with a smaller, through-passing inlet bore 57. This bore is fiber-adapted and holds the fiber in place in the insert. The bore may optionally be provided with a number of circumferentially extending V-shaped grooves 58, as shown in FIG. 7, which project out into the bore so as to ensure that the fiber is held in place but without unduly clamping the fiber so as to damage the same. As beforementioned, the insert 32 is divided in a plane which coincides with the common axis of the mold cavities. Each insert half has two bores 59 which house springs 60 which function to separate the insert halves so as to enable a fiber to be introduced into the insert 32 and so as to enable a molded ferrule to be removed from said insert. The insert halves are pressed together and held in place when inserting the insert 32 into the conical bore in the second cavity plate 3.

In a preferred embodiment, fibers are introduced into the mold, by inserting the fibers into the bores 57 provided in the inserts 32. The inserts 32 are then placed in the second cavity plate 3, in the conical bores thereof, so that the insert halves are pressed together around the fibers, the fibers being held in place by the grooves 58. The first cavity plate 2 is then placed on the second cavity plate 3 while guiding the free, outwardly projecting ends of the fibers into the openings 56 with the aid of the conical insertion parts 55, and into the recesses 14 in the runner plate 1, which is placed on the first cavity plate 2. The fibers therewith extend centered axially through the mold cavities, which is achieved as a result of the configuration of the cavity plates, as described above. The three plates are then placed on the support plate 4, such that the downwardly projecting fibers will be led out through the slots 41 on one side of the mold. The positioning pins 15, 27 and 33 and the positioning recesses 28, 34 and 42 herewith ensure that the plates 1, 2, 3 and 4 will be positioned correctly in relation to one another. The mold assembly is then placed in the molding machine on the fixed bottom plate 6 and the movable top plate 5 is moved down onto the mold assembly, whereafter molding can commence.

Molding is preferably commenced by introducing a thermosetting resin pellet into the heated transfer cylinder of the molding machine. The molten molding compound is then pressed through the primary runner system 11, 12 in the runner plate 1 and into the first cavity plate 2 through the vertical channels 21 and into the secondary runner system 22 which is cut-out between the first and the second cavity plates. The molding compound then flows into the mold cavities 24, 31, through the cavity channels 23 in the same interface between the two plates, so as to form the ferrules. As beforementioned, the cavity channels 23 discharge into the cavities at the outer diameter of the broader collar 53. A thinner, venting channel 26 opens at another part of this outer diameter, for instance opposite the cavity channel 23, so that air can escape during the molding process. This channel is also cut-out in the interface between the two plates.

The heated, fixed bottom plate 6 may be located slightly above the press platen, so that the fibers can be curved against the front edge of the press and held in a box during the molding process.

The mold is preferably kept heated at a constant temperature during the molding process. The molding compound used is preferably a thermosetting resin, since thermosetting resins soften when heated and thereafter begin to harden almost immediately. From the time of commencing the molding cycle, there is a short period in which the compound flows freely, followed by gelatination and hardening of the compound in the mold, whereafter the molded product is removed while still warm. A relatively long curing period is often required after emptying the mold.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the form of the invention herein shown and described is the presently preferred embodiment. Equivalent elements or materials may be substituted for those illustrated and described herein, the configuration of parts may be changed, and certain features of the invention may be utilized independently of the use of other features, all as would be apparent to one skilled in the art after having the benefit of this description of the invention.

We claim:

1. A method for molding a ferrule on a filament comprising the steps of:

positioning a runner plate between a primary plate and a secondary plate of a molding machine to allow a first face of the runner plate to engage the primary plate and a second face of the runner plate to be directed toward the secondary plate, the first face having a vertical inlet channel, the second face having a primary runner connecting with said vertical inlet channel to allow distribution of a molding compound;

inserting a first cavity plate between the runner plate and the secondary plate and inserting a second cavity plate between the first cavity plate and the secondary plate to allow a vertical channel in the first cavity plate to connect with the primary runner and a secondary runner wherein said secondary runner connects with mutually corresponding ferrule molding cavity-sections in said first and second cavity plates to form a ferrule molding cavity, said ferrule molding cavity having structure comprising:

mutually corresponding cylindrical coaxial bores positioned in said mutually corresponding ferrule molding cavity-sections and a larger coaxial cylindrical bore formed at a face of at least one cavity plate, at least one cylindrical coaxial bore being positioned in a divided conical insert inserted in a corresponding conical bore in the respective cavity plate, said divided conical insert comprising a narrow inlet bore positioned coaxial with the molding cavity to allow receipt of the filament;

inserting a support plate between the second cavity and the secondary plate and positioning the support plate against the secondary plate;

positioning a filament through the conical insert and through an orifice in said first cavity plate adapted to pass said filament positioned coaxial with the respective ferrule molding cavity-section to allow the narrow inlet bore to firmly retain the filament;

introducing a molding compound through said vertical inlet channel able to flow through said primary runner and secondary runner and into said ferrule molding cavity and molding a ferrule on the filament.

2. A mold for molding a ferrule on a filament comprising:

a runner plate insertable between a primary plate and a secondary plate of a molding machine, the runner plate having a first face and a second face, said first face having a vertical inlet channel and being positionable against the primary plate, said second face having a primary runner connecting with said vertical inlet channel to allow distribution of a molding compound;

a first cavity plate insertable between the runner plate and the secondary plate, and a second cavity plate insertable between the first cavity plate and the secondary plate, the first cavity plate having a vertical channel connectable with the primary runner and with a secondary runner leading to mutually corresponding ferrule molding cavity-sections in said first and second cavity plates, said first and second cavity plates being positionable to allow said mutually corresponding ferrule molding cavity-sections to form a ferrule molding cavity;

said ferrule molding cavity comprising mutually corresponding cylindrical coaxial bores positioned in said mutually corresponding ferrule molding cavity-sections and a larger coaxial cylindrical bore formed at a face of at least one cavity plate; at least one cylindrical coaxial bore being positioned in a divided conical insert insertable in a corresponding conical bore in the respective cavity plate, said divided conical insert comprising a narrow inlet bore positioned coaxial with the molding cavity to allow receipt of the filament; and a support plate insertable between the second cavity plate and the secondary plate and positionable against the secondary plate.

3. The mold of claim 2 wherein the support plate comprises a narrow filament receiving slot corresponding to said narrow inlet bore, said receiving slot extending from one side of the support plate to a position coincident with the inlet bore.

4. The mold of claim 2 wherein the primary plate is a moveable top plate and the secondary plate is a fixed bottom plate.

5. The mold of claim 2 wherein the molding machine is a transfer molding machine.

6. The mold of claim 2 wherein a secondary runner is positioned in the first cavity plate.

7. The mold of claim 2 wherein a secondary runner is positioned in the second cavity plate.

8. The mold of claim 2 wherein the divided conical insert is positionable in the second cavity plate.

9. The mold of claim 2 wherein the divided conical insert is divided through the axis of the ferrule molding cavity and in that a resilient member is arranged in the divided conical insert to urge said divided conical insert apart.

10. The mold of claim 2 further comprising an orifice in said first cavity plate adapted to allow passage of said filament positioned coaxial with the respective ferrule molding cavity-section and an orifice in said runner plate positionable coaxial with the orifice in said first cavity plate to allow said filament to project into the runner plate.

11. The mold of claim 10 further comprising a conical filament-insertion guide positioned in the ferrule molding cavity-section in the first cavity plate between the first cavity plate cylindrical coaxial bore and the first cavity plate orifice.

12. The mold of claim 2 further comprising a cylindrical bore cover positionable in said first cavity plate coaxial with the ferrule molding cavity-section of the first cavity plate, said cover having an orifice adapted to allow passage of said filament and a conical filament-insertion guide positionable in the ferrule molding cavity-section of the first cavity plate between the first cavity plate cylindrical coaxial bore and the first cavity plate cylindrical bore cover orifice.

13. The mold of claim 2 wherein at least one cylindrical coaxial bore is formed in an insert positionable in a through-passing bore in at least one of said cavity plates.

14. The mold of claim 2 wherein said narrow inlet bore of said divided conical insert comprises a plurality of substantially V-shaped grooves, projecting into the narrow inlet bore of said divided conical insert to allow securing the filament in place.

15. A mold for molding a plurality of ferrules on a corresponding number of filaments comprising:

a runner plate insertable between a primary plate and a secondary plate of a molding machine, the runner plate having a first face and a second face, said first face having a vertical inlet channel and being positionable against the primary plate, said second face having primary runners connecting with said vertical inlet channel to allow distribution of a molding compound;

a first cavity plate insertable between the runner plate and the secondary, plate, and a second cavity plate insertable between the first cavity plate and the secondary plate, the first cavity plate having vertical channels connectable with the primary runners and with secondary runners leading to a plurality of mutually corresponding ferrule molding cavity-sections in said first and second cavity plates, said first and second cavity plates being positionable to allow each of said mutually corresponding ferrule molding cavity-sections to form a ferrule molding cavity;

each ferrule molding cavity comprising mutually corresponding cylindrical coaxial bores positioned in said mutually corresponding ferrule molding cavity-sections and a larger coaxial cylindrical bore formed at a face of at least one cavity plate and at least one cylindrical coaxial bore of each ferrule molding cavity being positioned in a divided conical insert insertable in a corresponding conical bore in the respective cavity plate, each said divided conical insert comprising a narrow inlet bore positioned coaxial with the molding cavity to allow receipt of the corresponding filament; and a support plate insertable between the second cavity plate and the secondary plate and positionable against the secondary plate.

16. The mold of claim 15 wherein the ferrule molding cavity-sections are arranged in rows in corresponding positions in said first and second cavity plates.

17. The mold of claim 15 wherein the support plate comprises a plurality of narrow filament receiving slots corresponding to said narrow inlet bores, each said receiving slot extending from one side of the support plate to a position coincident with the corresponding inlet bore.

18. The mold of claim 15 further comprising a plurality of orifices in said first cavity plate adapted to allow passage of corresponding filaments positioned coaxial with respective ferrule molding cavity-sections and orifices in said runner plate positionable coaxial with the orifices in said first cavity plate to allow corresponding filaments to project into the runner plate.

19. The mold of claim 18 further comprising a plurality of conical filament-insertion guides each positioned in corresponding ferrule molding cavity-sections in the first cavity plate between each cylindrical coaxial bore of the first cavity plate and each orifice of the first cavity plate.

20. The mold of claim 15 further comprising a plurality of cylindrical bore covers, each being positionable in said first cavity plate coaxial with respective ferrule molding cavity-sections, and each said cover having an orifice adapted to allow passage of corresponding filaments and a plurality of conical filament-insertion guides each positionable in corresponding ferrule molding cavity-sections of the first cavity plate between each corresponding cylindrical coaxial bore of the first cavity plate and each corresponding cylindrical bore cover orifice of the first cavity plate.

21. The mold of claim 15 wherein at least one cylindrical coaxial bore in each ferrule molding cavity is formed in an insert positionable in a through-passing bore in at least one of said cavity plates.

22. The mold of claim 1 wherein each narrow inlet bore of each divided conical insert comprises a plurality of substantially V-shaped grooves, projecting into the narrow inlet bore of each said insert to allow securing the corresponding filament in place.

* * * * *